United States Patent
Ho Cheong et al.

(10) Patent No.: US 7,459,821 B2
(45) Date of Patent: Dec. 2, 2008

(54) PERMANENT MAGNET ASSISTED SYNRM AND METHOD FOR IMPOSING MAGNETIC FORCE THEREON

(75) Inventors: Dal Ho Cheong, Seoul (KR); Kyung Hoon Lee, Seoul (KR); Hyun Hun Shin, Seoul (KR); June Hee Won, Seoul (KR); Jae Yoon Oh, Kwangmyung-si (KR); Gil Su Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/028,314

(22) Filed: Jan. 4, 2005

(65) Prior Publication Data
US 2006/0043812 A1 Mar. 2, 2006

(30) Foreign Application Priority Data
Aug. 26, 2004 (KR) .................. 10-2004-0067600

(51) Int. Cl.
*H02K 1/27* (2006.01)
*H02K 21/14* (2006.01)

(52) U.S. Cl. .................. 310/156.57; 310/156.53; 310/156.56

(58) Field of Classification Search ............ 310/156.53, 310/156.56, 156.57
See application file for complete search history.

(56) References Cited

U.S. PATENT DOCUMENTS

| | | | | |
|---|---|---|---|---|
| 2,802,124 A * | 8/1957 | Sjoblom | .................. | 310/211 |
| 3,652,885 A * | 3/1972 | Honsinger | .................. | 310/163 |
| 4,924,130 A * | 5/1990 | Fratta | .................. | 310/261 |
| 6,211,593 B1 | 4/2001 | Nashiki | | |
| 6,225,724 B1 * | 5/2001 | Toide et al. | .................. | 310/216 |
| 6,555,940 B2 * | 4/2003 | Naito et al. | ............ | 310/156.56 |
| 6,630,762 B2 * | 10/2003 | Naito et al. | ............ | 310/156.53 |
| 6,664,688 B2 * | 12/2003 | Naito et al. | ............ | 310/156.01 |
| 6,703,746 B2 * | 3/2004 | Biais et al. | ............ | 310/156.53 |
| 6,741,003 B2 * | 5/2004 | Naito et al. | ............ | 310/156.53 |
| 6,815,859 B2 * | 11/2004 | Sakuma et al. | ......... | 310/156.53 |
| 6,836,045 B2 * | 12/2004 | Murakami et al. | ..... | 310/156.53 |
| 7,038,345 B2 * | 5/2006 | Fratta | .................. | 310/156.53 |
| 2002/0041127 A1 * | 4/2002 | Naito et al. | ............ | 310/156.07 |

(Continued)

FOREIGN PATENT DOCUMENTS

GB 940997 11/1963

(Continued)

OTHER PUBLICATIONS

English language Abstract of JP 2003-324874.

(Continued)

*Primary Examiner*—Karl I Tamai
(74) *Attorney, Agent, or Firm*—Greenblum & Bernstein, P.L.C.

(57) ABSTRACT

A PMA (Permanent Magnet Assisted) synRM and a method for imposing a magnetic force thereon. Magnets are inserted into outer flux barriers of a plurality of flux barriers formed along the radius of a rotor, and bridges or slim portions are formed on inner flux barriers at positions corresponding to the positions of the magnets so that the magnetic force is imposed on the magnets through coils. Since the number of the flux barriers is sufficiently increased while the amount of the magnets consumed is decreased, the PMA synRM has increased efficiency and reduced production costs.

12 Claims, 7 Drawing Sheets

U.S. PATENT DOCUMENTS

| | | | |
|---|---|---|---|
| 2003/0020351 A1* | 1/2003 | Lee et al. | 310/156.53 |
| 2003/0062791 A1* | 4/2003 | Reiter et al. | 310/156.53 |
| 2003/0102755 A1* | 6/2003 | Naito et al. | 310/156.39 |
| 2003/0164655 A1* | 9/2003 | Biais et al. | 310/156.53 |
| 2003/0209950 A1* | 11/2003 | Biais et al. | 310/156.53 |
| 2003/0222526 A1* | 12/2003 | Matsunobu et al. | 310/156.45 |
| 2004/0150282 A1* | 8/2004 | Murakami et al. | 310/156.53 |
| 2005/0110355 A1* | 5/2005 | Sakuma et al. | 310/156.53 |
| 2005/0140236 A1* | 6/2005 | Jeong et al. | 310/156.53 |
| 2005/0179334 A1* | 8/2005 | Yoshinaga | 310/156.47 |
| 2005/0258699 A1* | 11/2005 | Hsu | 310/156.56 |
| 2006/0043812 A1* | 3/2006 | Cheong et al. | 310/156.53 |
| 2006/0103254 A1* | 5/2006 | Horst | 310/156.53 |

FOREIGN PATENT DOCUMENTS

| | | | |
|---|---|---|---|
| JP | 2000050542 A | * | 2/2000 |
| JP | 2000-333389 | * | 11/2000 |
| JP | 2002-209349 | | 7/2002 |
| JP | 2002-252939 | | 9/2002 |
| JP | 2003-324874 | | 11/2003 |

OTHER PUBLICATIONS

English language Abstract of JP 2002-209349.
English language Abstract of JP 2002-252939.

* cited by examiner

FIG. 10A
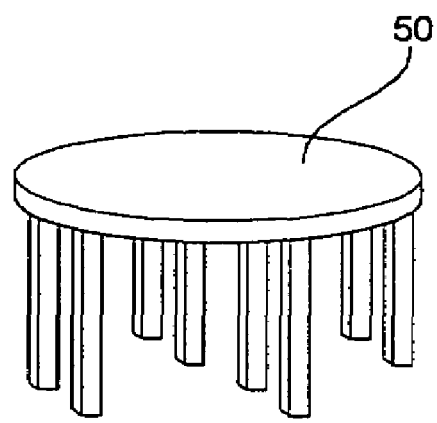
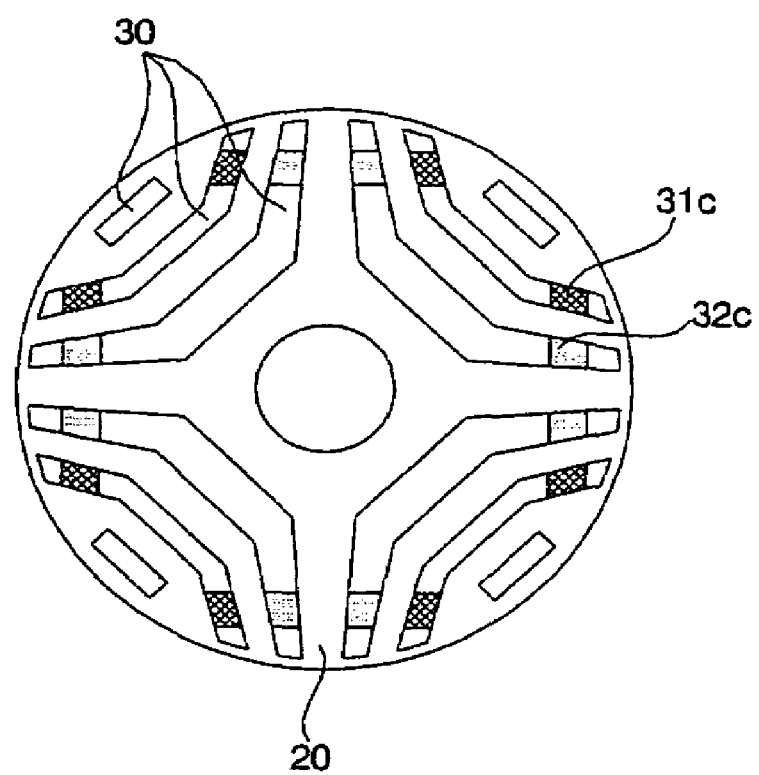
FIG. 10B

FIG. 11A
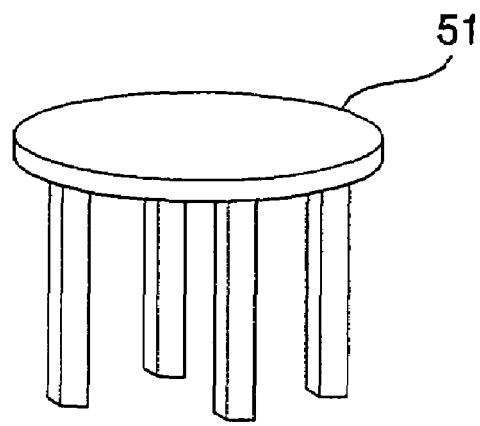
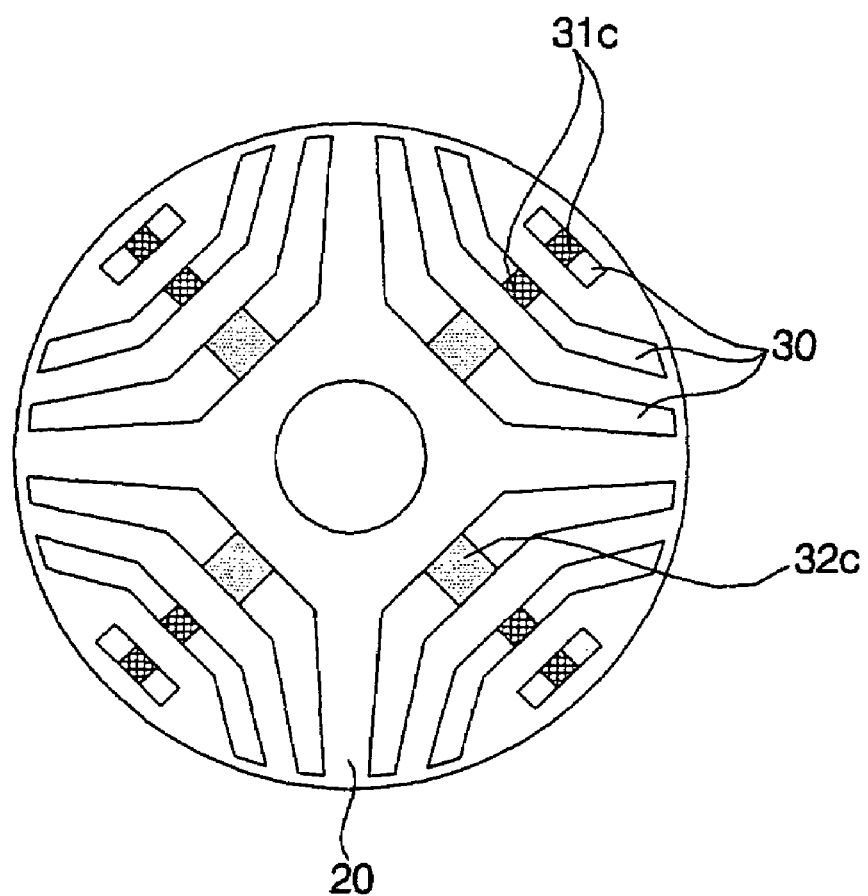
FIG. 11B

PERMANENT MAGNET ASSISTED SYNRM AND METHOD FOR IMPOSING MAGNETIC FORCE THEREON

BACKGROUND OF THE INVENTION

1. Field of the Invention

The present invention relates to a permanent magnet assisted (hereinafter, referred to as "PMA") synchronous reluctance motor (hereinafter, referred to as "synRM") and a method for imposing a magnetic force thereon, and more particularly to a PMA synRM, which is connected to a compressor, and comprises a sufficiently large number of flux barriers formed in a rotor and a decreased number of magnets inserted into the flux barriers, and a method for imposing a magnetic force thereon.

2. Description of the Related Art

Now, with reference to FIGS. 1 and 2, the structures of a conventional synRM and a conventional PMA synRM will be described.

FIG. 1 is a partial cross-sectional view of the conventional synRM. As shown in FIG. 1, the conventional synRM comprises a stator 1, and a rotor 2 rotatably installed in the stator 1 and synchronously rotated to minimize the magnetic reluctance by a reluctance torque generated due to the interaction between the stator 1 and the rotor 2 when power is applied to the stator 1.

A plurality of flux barriers 3 for blocking the current of the magnetic flux are formed along the radius of the stator 2, and a rib 4 for facilitating the smooth current of magnetic flux is placed in a space between the ends of the flux barriers 3 and the outer diameter of the stator 1.

Hereinafter, the operation of the above-described conventional synRM will be described in detail.

When power is applied to coils (not shown) wound on the stator 1, a rotating magnetic field is formed. The rotor 2 generates induced current due to the rotating magnetic field, thereby being magnetized. Since the current of the magnetic flux, which flows in the direction of passing through the flux barriers 3 containing an air layer therein, is blocked by the flux barriers 3, the magnetic reluctance is increased in the direction toward the flux barriers 3.

The rib 4 placed between the flux barriers 3 and the stator 1 is obtained by stacking steel sheets, having a low thickness, which are generally the same material as that of the rotor 2. Thus, since the current of the magnetic flux toward the rib 4 is not blocked, the magnetic reluctance toward the rib 4 is decreased.

Accordingly, the current of the magnetic flux of the stator 2 has variations in magnetic reluctance according to routes. The larger the difference of the magnetic reluctance is, the smaller current generates a high reluctance torque.

FIG. 2 is a partial cross-sectional view of a conventional PMA synRM. The conventional PMA synRM is obtained by inserting permanent magnets into the insides of the flux barriers 3 formed in the rotor 2 of the conventional synRM. Differing from the conventional synRM, the conventional PMA synRM uses magnetic torque as well as reluctance torque, thereby having an improved efficiency.

Hereinafter, the constitution and operation of the above-described conventional PMA synRM will be described in detail.

The conventional PMA synRM comprises the stator 1, the rotor 2 rotatably installed in the stator 1 and provided with the flux barriers 3 formed therein, and magnets 3a inserted into the flux barriers 3 in a predetermined direction along the radius of the rotor 2.

The above PMA synRM, compared to a general synRM, has a decreased inductance (Lq) along the q axis due to the energy ($\lambda$m) of the magnetic flux generated by the magnets 3a inserted into the flux barriers 3 as well as the magnetic flux by power, and thus has an increased torque constant (Te). The comparison of the PMA synRM and the synRM will be described as follows.

$$synRM \quad Te = \frac{3}{2}\frac{P}{2}\{(L_d i_d) i_q - (L_q i_q) i_d\}$$

$$PMA\ synRM \quad Te = \frac{3}{2}\frac{P}{2}\{(L_d i_d) i_q + (\lambda_m - L_q i_q) i_d\}$$

Here, d and q represent axes according to the positions of the rotor 2, and Te of the PMA synRM is a torque equation of the PMA synRM into which the magnets 3a are inserted through the q axis. As stated in the above equation, the additional magnetic flux generated due to the magnets 3a inserted along the q axis increases the torque of the PMA synRM at the same current.

Hereinafter, with reference to FIGS. 1 and 2, routes of the magnetic flux of the synRM and the PMA synRM will be comparatively described.

In the synRM as shown in FIG. 1, when the synRM is magnetized along the q axis, most of the magnetic flux flows through the rib 4, but a smaller portion of the magnetic flux passes through the flux barriers 3, this portion of the magnetic flux being referred to as a leakage magnetic flux. The leakage magnetic flux increases the value of the inductance (Lq) along the q axis, thereby decreasing the value of the torque.

In the PMA synRM as shown in FIG. 2, when the PMA synRM is magnetized along the q axis, the leakage magnetic flux generated due to the power applied to the stator 1 and the magnetic f lux generated due to the magnets 3a collide with each other. Thus, since most of the magnetic flux flows through the rib 4, the value of the inductance (Lq) along the q axis is decreased, thereby increasing the value of the torque.

In case that magnetic force is imposed on the magnets 3a of the PMA synRM and then the PMA synRM is connected to a compressor, foreign substances can stick to the rotor 2 of the PMA synRM. Accordingly, before a magnetic force is imposed on the magnets 3a of the PMA synRM, the PMA synRM must be inserted into and then connected to the compressor. Thereafter, a magnetic force is imposed on the magnets 3a of the PMA synRM by applying a high voltage to the coils wound on the stator 1.

In case that a small number of the flux barriers 3 are formed in the rotor 2, as shown in FIG. 2, the magnets 3a are inserted into all of the flux barriers 3, thereby allowing magnetic flux energy due to the voltage applied to the stator 1 to form a perfect magnetic flux route along the steel portion, the magnets 3a, and the steel portion of the rotor 2. Thus, it is possible to impose a magnetic force on the magnets 3a using the coils.

However, in case that a large number of the flux barriers 3 are formed in the rotor 2, the magnets 3a, which are inserted into all of the flux barriers 3, cause an increase of production costs of the PMA synRM.

In case that the number of the flux barrier formed in the rotor 2 is decreased so as to limit the increase of the production costs of the PMA synRM due to the use of a large number of the magnets, a reluctance torque constant is a low value when the PMA synRM is operated in a normal state, thereby decreasing the efficiency of the PMA synRM.

SUMMARY OF THE INVENTION

Therefore, the present invention has been made in view of the above problems, and it is an object of the present invention to provide a PMA synRM, which comprises a sufficiently large number of flux barriers and a decreased amount of magnets consumed, inserted into the flux barriers, when a magnetic force is imposed on the magnets, and a method for imposing a magnetic force thereon, thereby increasing the efficiency of the PMA synRM and reducing the production costs of the PMA synRM.

In accordance with one aspect of the present invention, the above and other objects can be accomplished by the provision of a PMA synRM comprising: a stator, on which coils are wound; a rotor rotatably installed on the inside of the stator; and a plurality of flux barriers formed in the rotor along the radius of the rotor, wherein magnets are inserted into designated portions of outer flux barriers, located in the outer portions of the rotor, and bridges are formed on inner flux barriers, located in the inner portions of the rotor, at positions corresponding to the positions of the magnets so that routes of a magnetic flux are formed when a magnetic force is imposed on the magnets through the coils.

Preferably, the magnets may be inserted into both sides of the outer flux barriers, and the bridges may be formed at both sides of the inner flux barriers at positions corresponding to the positions of the magnets.

Further, preferably, the magnets may be inserted into the centers of the outer flux barriers, and the bridges may be formed at the centers of the inner flux barriers at positions corresponding to the positions of the magnets.

More preferably, the magnets may be inserted into the outermost flux barriers formed along the radius of the rotor, and the bridges may be formed on the inner flux barriers located on the inside of the outermost flux barriers.

Further, preferably, the magnets may be inserted into the first and second outermost flux barriers formed along the radius of the rotor, and the bridges may be formed on the inner flux barriers located on the inside of the second outermost flux barriers.

Moreover, preferably, the bridges may be formed on the inner flux barriers at positions, through which magnetic flux having passed through the magnets passes, when the magnetic force is imposed on the magnets through the coils, and may be obtained by inserting a steel material into the flux barriers.

Preferably, the widths of the bridges may be increased in proportion to the amount of the correspondent magnets so that the sufficient amount of the magnetic force is imposed on the magnets.

In accordance with another aspect of the present invention, there is provided a PMA synRM comprising: a stator, on which coils are wound; a rotor rotatably installed on the inside of the stator; and a plurality of flux barriers formed in the rotor along the radius of the rotor, wherein magnets are inserted into designated portions of outer flux barriers, located in the outer portions of the rotor, and slim portions having a low thickness are formed on inner flux barriers, located in the inner portions of the rotor, at positions corresponding to the positions of the magnets so that routes of magnetic flux are formed when a magnetic force is imposed on the magnets through the coils.

In the same manner as the PMA synRM of the preceding aspect, the magnets of the PMA synRM of this aspect may be are inserted into both sides of the outer flux barriers, and the slim portions may be formed at both sides of the inner flux barriers at positions corresponding to the positions of the magnets.

Further, wherein the magnets may be inserted into the centers of the outer flux barriers, and the slim portions may be formed at the centers of the inner flux barriers at positions corresponding to the positions of the magnets.

Preferably, the magnets may be inserted into the outermost flux barriers or the first and second outermost flux barriers formed along the radius of the rotor, and the slim portions may be formed on the inner flux barriers located on the inside of the outermost flux barriers or the first and second outermost flux barriers.

Further, preferably, the widths of the slim portions may be increased in proportion to the amount of the correspondent magnets so that the sufficient amount of the magnetic force is imposed on the magnets.

In accordance with yet another aspect of the present invention, there is provided a method for imposing a magnetic force on a PMA synRM comprising: connecting the PMA synRM, in which a plurality of flux barriers are formed along the radius of a rotor and magnets are inserted into outer flux barriers located in the outer portions of the rotor, to a compressor; inserting solid bodies made of a steel material into inner flux barriers, located in the inner portions of the rotor, at positions corresponding to the positions of the magnets; starting the imposition of the magnetic force on the magnets by applying a voltage to coils wound on the external surface of a stator; and removing the solid bodies from the inner flux barriers, after the imposition of the magnetic force on the magnets is completed.

Preferably, the magnets may be inserted into both sides of the outer flux barriers in the connection of the PMA synRM to the compressor; and the solid bodies may be inserted into both sides of the inner flux barriers in the insertion of the solid bodies into the inner flux barriers.

Further, preferably, the magnets may be inserted into the centers of the outer flux barriers in the connection of the PMA synRM to the compressor; and the solid bodies are inserted into the centers of the inner flux barriers in the insertion of the solid bodies into the inner flux barriers.

BRIEF DESCRIPTION OF THE DRAWINGS

The above and other objects, features and other advantages of the present invention will be more clearly understood from the following detailed description taken in conjunction with the accompanying drawings, in which:

FIGS. 10A, 10B and 11A, 11B are respectively perspective views of solid bodies and cross-sectional views of rotors of PMA synRMs in accordance with embodiments of the present invention.

DESCRIPTION OF THE PREFERRED EMBODIMENTS

Figure 1:
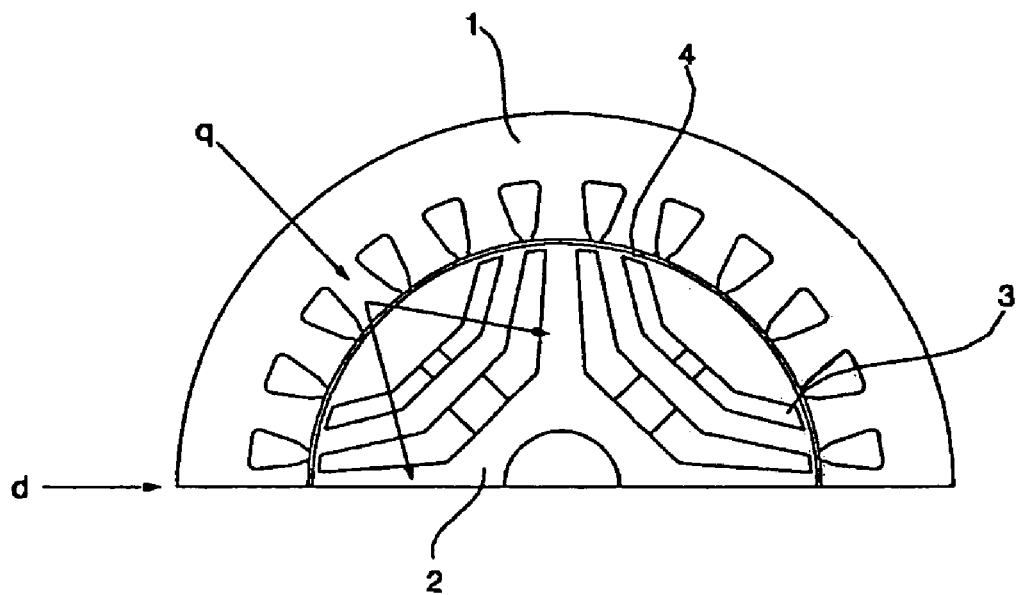
FIG. 1 is a partial cross-sectional view of a conventional synRM.
Figure 2:
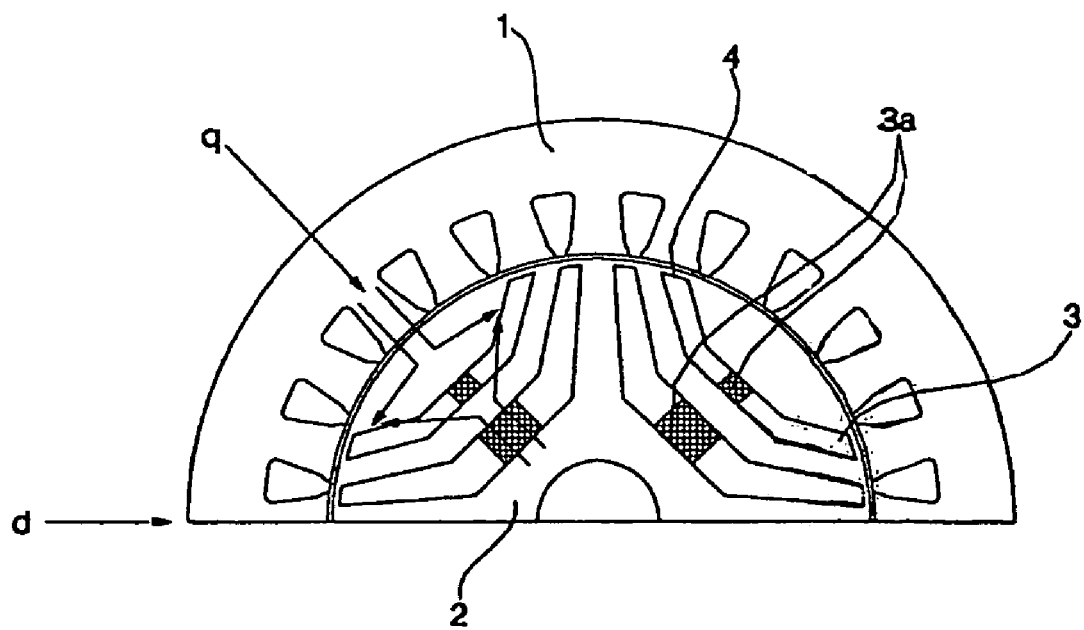
FIG. 2 is a partial cross-sectional view of a conventional PMA synRM.

Now, preferred embodiments of the present invention will be described in detail with reference to the annexed drawings. In the following description of the present invention, the same or similar elements are denoted by the same reference numerals even though they are depicted in different drawings.

FIGS. 3 to 6 are partial cross-sectional views illustrating a stator and a rotor of a PMA synRM in accordance with a first embodiment of the present invention. Here, the arrows shown in FIGS. 3 to 6 denote the routes of magnetic flux.

The PMA synRM in accordance with the first embodiment of the present invention comprises a stator 10, a rotor 20, magnets 31, which are inserted into portions of outer flux barriers 30a, 30b of a plurality of flux barriers 30 formed along the radius of the stator 20, and bridges 32 formed on the inner flux barriers 30c at positions corresponding to the positions of the magnets 31 inserted into the outer flux barriers 30a, 30b.

Figure 3:
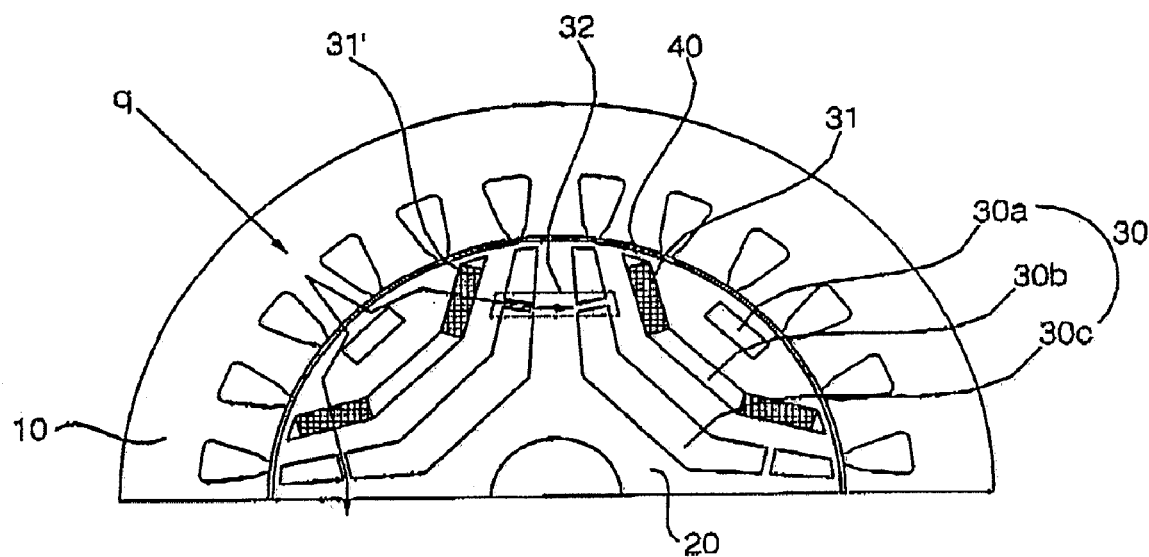
FIGS. 3 to 6 are partial cross-sectional views of a PMA synRM in accordance with a first embodiment of the present invention.
Figure 4:
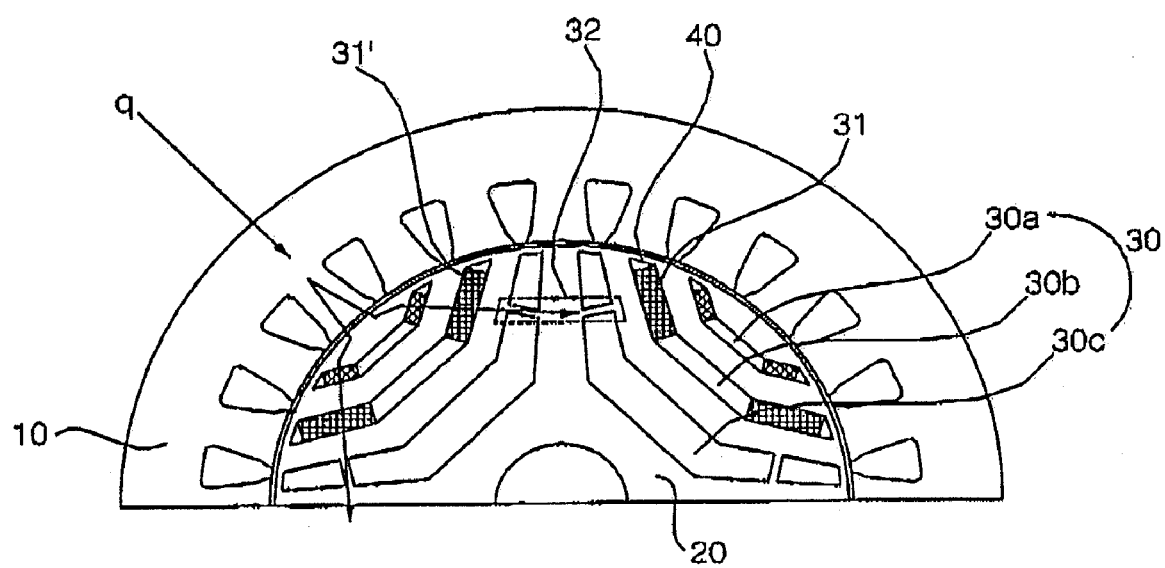

Particularly, in FIGS. 3 and 4, the magnets 31 are inserted into both sides of the outer flux barriers 30a, 30b located in the outer portions of the rotor 20, and the bridges 32 are formed at both sides of the inner flux barriers 30c located in the inner portions of the rotor 20, at positions corresponding to the positions of the magnets 31.

More particularly, in FIG. 3, the magnets 31 are inserted into both sides of the second outermost flux barriers 30b formed along the radius of the rotor 20, and the bridges 32 are formed at both sides of the inner flux barriers 30c located at the inside portions of the second outermost flux barriers 30b.

Further, in FIG. 4, the magnets 31 are inserted into both sides of the first outermost flux barriers 30a and the second outermost flux barriers 30b and the bridges 32 are formed at both sides of the inner flux barriers 30c located at the inside portions of the second outermost flux barriers 30b.

Preferably, the bridges 32 formed on the inner flux barriers 30c cause magnetic flux, having passed through the magnets 31 inserted into the outer flux barriers 30a, 30b when magnetic force is imposed on the magnets 31, to progress in the direction of passing through the inner flux barriers 30c. The bridges 32, which are formed on the inner flux barriers 30c, form perfect routes for the magnetic flux, thereby being advantageous in imposing a magnetic force on the magnets 31 by use of coils.

The bridges 32 are obtained by inserting a steel material into the flux barriers 30. Preferably, the widths of the bridges 32, formed on the inner flux barriers 30c by the above method, are increased in proportion to the increase of the amount of the correspondent magnets 31.

In case that the widths of the bridges 32 are excessively narrow, although magnetic force is imposed on the stator 10 using a sufficiently high voltage, the electromagnetic field of the inserted magnets 31 is low. Since the magnetic flux of more than a designated amount for imposing a magnetic force on the magnets 31 cannot pass through the bridges 32 having the narrow widths, it is difficult to impose a sufficient amount of magnetic force on the magnets 31. Accordingly, preferably, the widths of the bridges 32 are elongated in proportion to the amount of the magnets 31, on which a magnetic force is imposed.

Figure 5:
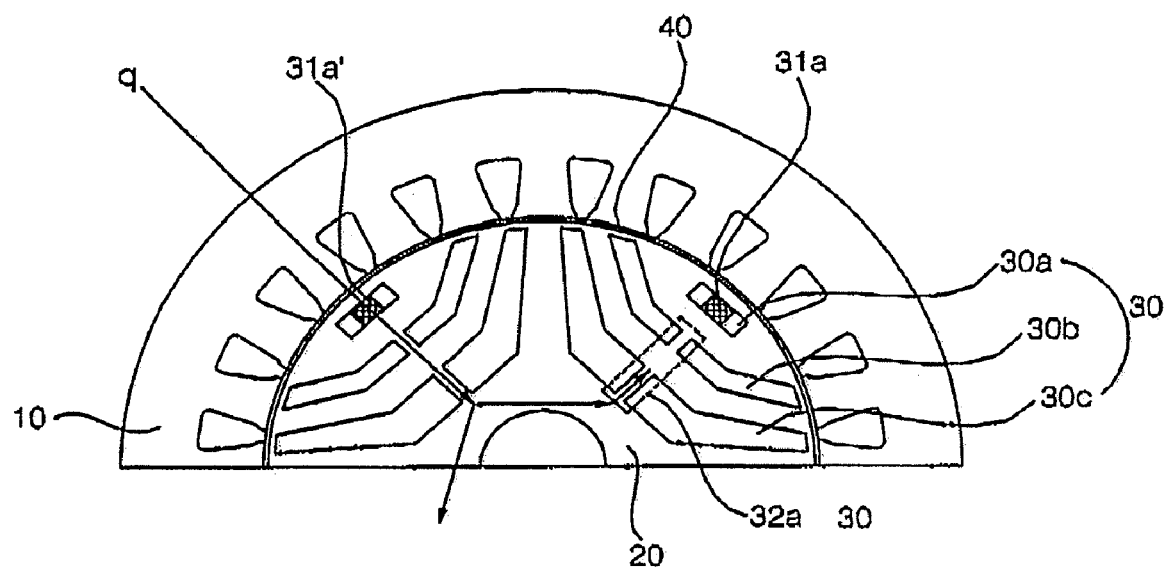
Figure 6:
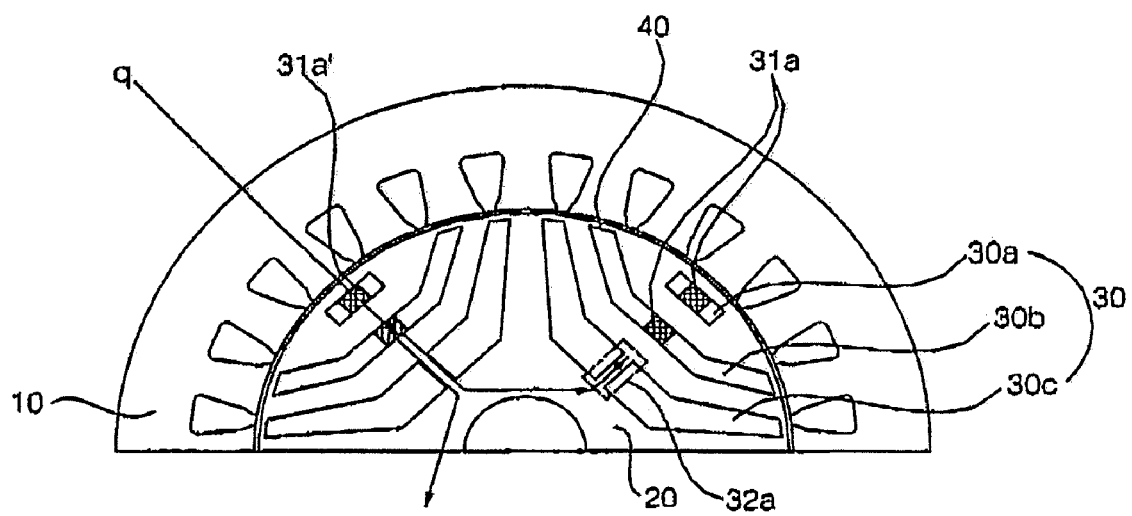

In FIGS. 5 and 6, magnets 31a are inserted into the centers of the outer flux barriers 30a, 30b located in the outer portions of the rotor 20, and bridges 32a are formed at centers of the inner flux barriers 30c located in the inner portions of the rotor 20, at positions corresponding to the positions of the magnets 31a.

More particularly, in FIG. 5, the magnets 31a are inserted into the centers of the first outermost flux barriers 30a formed along the radius of the rotor 20, and the bridges 32a are formed at the centers of the inner flux barriers 30c located at the inside portions of the second outermost flux barriers 30b.

Further, in FIG. 6, the magnets 31a are inserted into the centers of the first outermost flux barriers 30a and the second outermost flux barriers 30b, and the bridges 32a are formed at the centers of the inner flux barriers 30c located at the inside portions of the second outermost flux barriers 30b.

Preferably, the bridges 32a are formed at the portions of the inner flux barriers 30c, through which magnetic flux passes, and the widths of the bridges 32a are elongated in proportion to the amount of the magnets 31a corresponding to the bridges 32a.

Hereinafter, the imposition of magnetic force using coils as shown in FIGS. 3 to 6 will be described in detail.

In FIGS. 3 and 4, the magnets 31 are inserted into both sides of the flux barriers 30 of the rotor 20 and the bridges 32 are formed at both sides of the flux barriers 30 of the rotor 20 at positions corresponding to the positions of the magnets 31. Then, after the PMA synRM comprising the rotor 20 is connected to a compressor, power is applied to the stator 10, thereby starting the imposition of the magnetic force using coils.

The magnetic flux is generated from the stator 10, to which power is applied, and progresses along a designated route, thereby magnetizing the magnets 31. As shown by the arrows, the magnetic flux forms a magnetic route, which sequentially passes through the rotor 20 made of a steel material, the magnets 31 inserted into the outer flux barriers 30a, 30b, and the bridges 32 formed on the inner flux barriers 30c, thereby magnetizing the magnets 31.

In FIGS. 5 and 6, the magnets 31a are inserted into the centers of the flux barriers 30 of the rotor 20 and the bridges 32a are formed at the centers of the flux barriers 30 of the rotor 20 corresponding to the positions of the magnets 31a at positions corresponding to the positions of the magnets 31a. When power is applied to the stator 10, magnetic flux, which is generated from the stator 10, forms a magnetic route, which sequentially passes through the rotor 20, the magnets 31a inserted into the centers of the outer flux barriers 30a, 30b, and the bridges 32a formed at the centers of the inner flux barriers 30c thereby magnetizing the magnets 31a.

Now, the torque and efficiency of the PMA synRM comprising the above rotor 20 will be described. When the PMA synRIvI is aligned along the q axis and magnetized, most of magnetic flux passes through the rib 40, a smaller portion of the magnetic flux progressing toward the flux barriers 30 is offset by the magnets 31 or 31a formed in the outer flux barriers 3Oc. Thus, although the magnets 31 or 31a are not formed in the inner flux barriers 30c, the inductance (Lq) of the PMA synRM along the q axis is not excessively increased, and the increase of the inductance (Lq) is not sufficient to influence the performance of the motor.

Accordingly, the rotors 20 having the structures as shown in FIGS. 3 to 6 do not decrease the efficiency of the PMA synRM.

Generally, the ratio of the reluctance torque and the magnetic torque of the PMA synRM regarding to the width of the bridges 32 or 32a is 7-8:2-3. Thereby, since the magnets 31 and 31a inserted into the flux barriers 30 do not require a large amount, it is not necessary to increase the widths of the bridges 32 and 32a.

Figure 7:
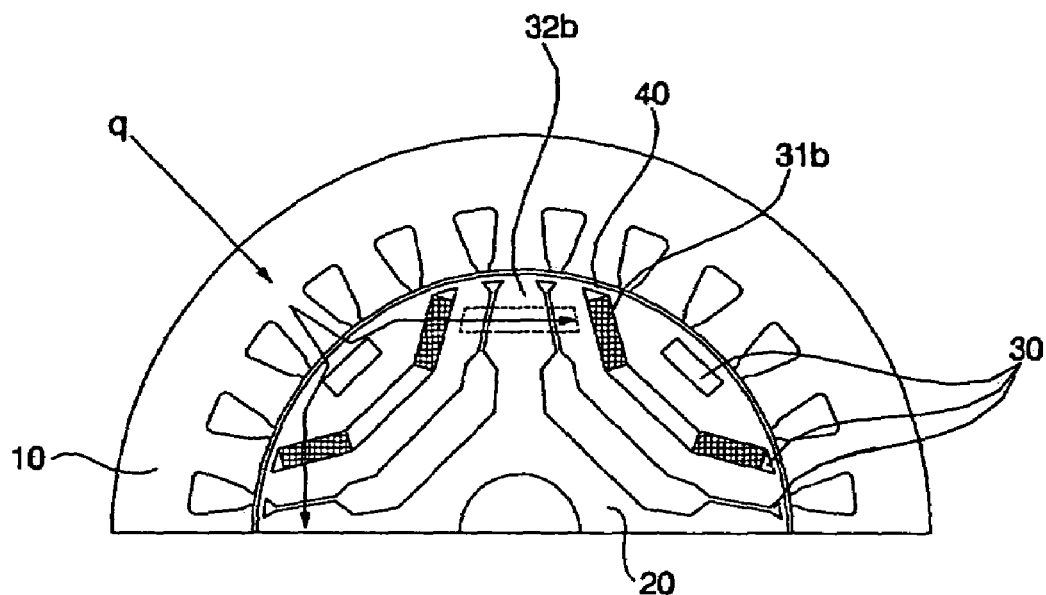
FIGS. 7 and 8 are partial cross-sectional views of a PMA synRM in accordance with a second embodiment of the present invention.
Figure 8:
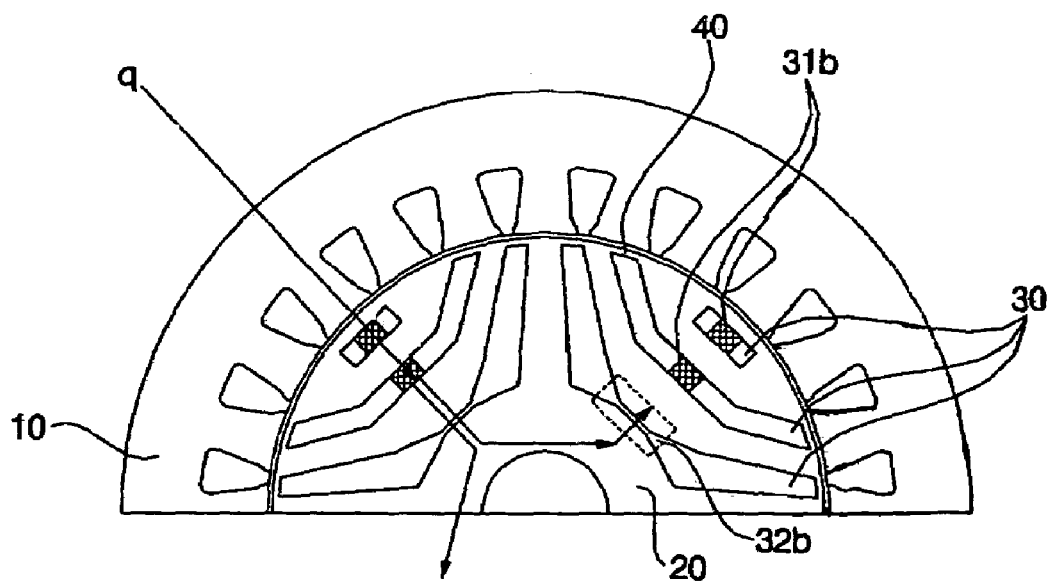

The rotor 20, having a shape such that the bridges 32 or 32a are inserted into the flux barriers 30, increases the inductance (Lq) of the PMA synRivi along the q axis, thereby decreasing the efficiency of the PMA synRM. However, since, as described above, the magnets 31 or 31a inserted into the outer flux barriers 30b, 30b collide with most of the magnetic flux and block most of the magnetic flux, the deterioration of the efficiency of the PMA synRM due to the insertion of the bridges 32 or 32a is scarcely generated FIGS. 7 and 8 are partial cross-sectional views of a PMA synRM in accordance with a second embodiment of the present invention. Here, the arrows shown in FIGS. 7 and 8 denote routes of magnetic flux.

In the PMA synRM in accordance with the second embodiment, magnets 31b are inserted into sides of outer flux barriers 30 of a plurality of flux barriers 30 formed along the radius of the stator 20, and slim portions 32b having a low thickness are formed on inner flux barriers 30 at positions corresponding to the positions of the magnets 31b.

In the same manner as the first embodiment of the present invention, the magnets 31b of the PMA synRM of the second embodiment, which are inserted into the outer flux barriers 30, may have various positions. In FIG. 7, the magnets 31b are inserted into both sides of the outer flux barriers 30, and the slim portions 32b having a low thickness are formed at both sides of the inner flux barriers 30 at positions corresponding to the positions of the magnets 31b.

In FIG. 8, the magnets 31b are inserted into the centers of the outer flux barriers 30, and the slim portions 32b having a low thickness are formed at the centers of the inner barriers 30 at positions corresponding to the positions of the magnets 31b.

The magnets 31b may be inserted into the outermost flux barriers 30 or the first and second outermost flux barriers 30, and the bridges 32b may be formed on the inner flux barriers 30 located at the inside portions of the outermost flux barriers 30 or the first and second outermost flux barriers 30, into which the magnets 31b are inserted.

Preferably, the slim portions 32b are formed at the portions of the inner flux barriers 30, through which a magnetic flux, having passed through the magnets 31b inserted into the outer flux barriers, passes, and the widths of the slim portions 32b are elongated in proportion to the amount of the magnets 31b corresponding to the slim portions 32b.

Hereinafter, the operation of the above-described PMA synRM in accordance with the second embodiment will be described in detail.

The general method for magnetizing the magnets 31b inserted into the outer flux barriers 30 of the rotor 20 by applying power to the stator 10 of the PMA synRM of the second embodiment is the same as that of the PMA synRM of the first embodiment. The magnetic flux generated from the stator 10 passes through the rotor 20 and the magnets 31b inserted into the outer flux barriers 30, and then passes through the slim portions 32b of the inner flux barriers 30 corresponding to the positions of the magnets 31b, thereby forming routes for the magnetic flux.

In order to allow the magnetic flux to passes through the slim portions 32b of the flux barriers 30, it is necessary to apply a large amount of power, more than a designated value, to the stator 10. Thereby, the magnetic flux passes through the flux barriers 30, thus forming designated routes and magnetizing the magnets 31b.

In this embodiment, it is not necessary to form bridges made of a steel material on the inner flux barriers 30. When the PMA synRM is operated at a normal state, the PMA synRM of this embodiment limits the increase of the inductance (Lq) compared to the PMA synRM having the bridges, thereby increasing the efficiency of the PMA synRM.

Hereinafter, with reference to FIGS. 9 to 11, a method for imposing a magnetic force on the PMA synRM of the present invention will be described in detail.

Figure 9:
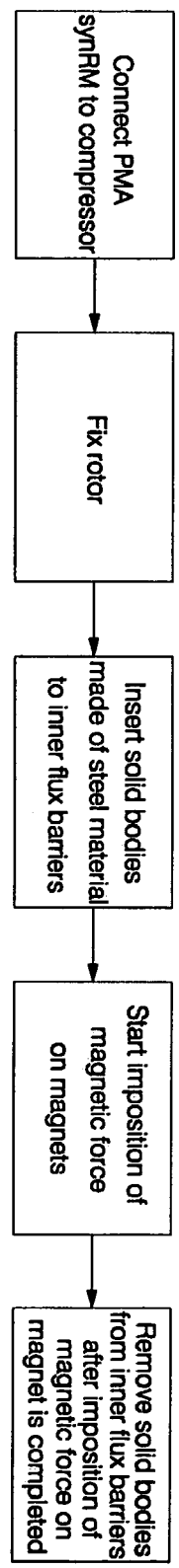
FIG. 9 is a flow chart illustrating a method for imposing a magnetic force on the PMA synRM of the present invention.

FIG. 9 is a flow chart illustrating the method for imposing a magnetic force on the PMA synRM of the present invention.

First, a plurality of flux barriers are formed along the radius of a rotor, and magnets are inserted into outer flux barriers located in the outer portions of the rotor. Then, the PMA synRM is connected to a compressor.

Thereafter, the rotor of the PMA synRM, which is connected to the compressor, is fixed, and solid bodies made of a steel material are inserted into inner flux barriers located in the inner portions of the rotor.

After the solid bodies are inserted into the inner flux barriers, a voltage is applied to coils wound around the stator, thereby starting the imposition of magnetic force on the magnets. When the imposition of the magnetic force on the magnets is completed, the solid bodies are removed from the inner flux barriers. Thereby, the imposition of the magnetic force on the PMA synRM motor is completed.

By inserting the solid bodies made of a steel material into the inner flux barriers, it is possible to allow the magnetic flux, having passed through the magnets, to progress along the solid bodies when the magnetic force is imposed on the magnets by use of the coils, thereby setting the routes of the magnetic flux.

FIGS. 10A, 10B and 11A, 11B are respectively perspective views of solid bodies and cross-sectional views of rotors of PMA synRMs in accordance with embodiments of the present invention.

FIGS. 10A and 10B illustrate a solid body 50 and the rotor 20, in case that magnets 31c are inserted into both sides of the outer flux barriers 30. FIGS. 11A and 11B illustrate a solid body 51 and the rotor 20, in case that the magnets 31c are inserted into the centers of the outer flux barriers 30.

As shown in FIGS. 10A, 10B, 11A, and 11B, the magnets 31c are inserted into both sides or centers of the outer flux barriers 30, and insertion portions 32c, into which the solid bodies 50 or 51 are inserted, are formed at positions of the inner flux barriers corresponding to the positions of the magnets 31c. Accordingly, when power is applied to the stator, the magnetic flux, which had passed through the magnets 31c and the steel materials of the rotor 20, passes through the insertion portions 32c of the inner flux barriers 30, and forms routes, thereby magnetizing the magnets 31c.

In accordance with the above methods for imposing the magnetic force on the magnets 31c using the solid bodies 50 and 51, it is not necessary to form bridges on the inner flux barriers 30 of the rotor 20, thereby limiting the increase of the inductance (Lq) and increasing the efficiency of the PMA synRM. However, an accurate tolerance is required due to the continuity of the routes of the magnetic flux when the solid bodies 50 and 51 are inserted into the inner flux barriers 30, thus avoiding disadvantages in imposing the magnetic force on the magnets 31c.

As apparent from the above description, the present invention provides a PMA synRM, which comprises a sufficiently large number of flux barriers and a decreased amount of magnets consumed, and a method for imposing a magnetic force thereon, thereby increasing the efficiency of the PMA synRM and reducing the production costs of the PMA synRM.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is;

1. A permanent magnet assisted synchronous reluctance motor, comprising;
    a stator, on which coils are wound;
    a rotor rotatably installed within the stator;
    a plurality of flux barriers comprising outer flux barriers formed in outer portions of the rotor and inner flux barriers formed in inner portions of the rotor, wherein the outer flux barriers and inner flux barriers are formed along a radius of the rotor, wherein centers of the inner flux barriers are provided radially inward of centers of the outer flux barriers with respect to a central axis of the rotor;
    magnets inserted within corresponding outer openings defined by the outer flux barriers; and
    bridges are formed which traverse corresponding inner openings defined by inner flux barriers so that corresponding routes for magnetic flux are formed extending between opposing magnets inserted in the outer openings when the coil imposes a magnetic force on the magnets,
    wherein the magnets are inserted within first and second sides of each of the outer flux barriers, and the bridges are provided at first and second sides of each of the inner flux barriers at positions corresponding to the positions of the magnets, and
    wherein center portions of the outer flux barriers are empty, and
    wherein all the space of the inner flux barriers, excluding the bridges, are empty.

2. The permanent magnet assisted synchronous reluctance motor as set forth in claim 1,
    wherein the magnets are inserted into the ends of the outer flux barriers, and the bridges are formed at the ends of the inner flux barriers at positions corresponding to the positions of the magnets.

3. The permanent magnet assisted synchronous reluctance motor as set forth in claim 2,
    wherein the outermost flux barriers comprises corresponding first and second outer flux barriers, wherein the first outer flux barrier is positioned radially outward of the second outer flux barrier and magnets are inserted within both the first and second outer flux barriers, and the bridges are formed at the inner flux barriers positioned radially inward of the second outermost flux barriers.

4. The permanent magnet assisted synchronous reluctance motor as set forth in claim 2,
    wherein a steel material is positioned within the inner flux barriers to form the bridges.

5. The permanent magnet assisted synchronous reluctance motor as set forth in claim 2,
    wherein the widths of the bridges are increased in proportion to the amount of the corresponding magnets.

6. The permanent magnet assisted synchronous reluctance motor as set forth in claim 2, wherein corresponding bridges extending between opposing magnets are oriented such that a longitudinal extent of the respective bridges extend generally perpendicularly to a longitudinal extent of the opposing magnets.

7. The permanent magnet assisted synchronous reluctance motor as set forth in claim 1, wherein respective outer flux barriers are bounded by the outer circumference of the rotor and respective inner flux barriers.

8. The A permanent magnet assisted synchronous reluctance motor comprising,
    a stator, on which coils are wound;
    a rotor rotatably installed within the stator;
    a plurality of flux barriers comprising outer flux barriers formed in outer portions of the rotor and inner flux barriers formed in inner portions of the rotor, wherein the outer flux barriers and inner flux barriers are formed along a radius of the rotor, wherein centers of the inner flux barriers are provided radially inward of centers of the outer flux barriers with respect to a central axis of the rotor;
    magnets inserted within corresponding outer openings defined by the outer flux barriers; and
    bridges are formed which traverse corresponding inner openings defined by inner flux barriers so that corresponding routes for magnetic flux are formed extending between opposing magnets inserted in the outer openings when the coil imposes a magnetic force on the magnets,
    wherein the magnets are formed at the centers of the outer flux barriers, and the bridges are positioned at the centers of the inner flux barriers at positions corresponding to the positions of the magnets,
    wherein sides of the outer flux barriers are empty, and
    wherein all the space of the inner flux barriers, excluding the bridges, are empty.

9. The permanent magnet assisted synchronous reluctance motor as set forth in claim 8,
    wherein the bridges are positioned at the inner flux barriers such that the magnetic flux which passes through the magnets passes through the bridges when coil imposes a magnetic force on the magnets.

10. The permanent magnet assisted synchronous reluctance motor as set forth in claim 8,
    wherein a steel material positioned within the inner flux barriers forms the bridges.

11. The permanent magnet assisted synchronous reluctance motor as set forth in claim 8,
    wherein the widths of the bridges are increased in proportion to the amount of the corresponding magnets.

12. A permanent magnet assisted synchronous reluctance motor, comprising;
    a stator having coils wound thereon;
    a rotor rotatably installed on the inside of the stator; and
    a plurality of flux barriers formed in the rotor and spaced apart from each other by a predetermined distance in a direction of a radius of the rotor, the plurality of flux barriers including outer flux barriers and inner flux barriers,
    wherein the inner flux barriers are formed to surround the outer flux barriers, the inner flux barriers being positioned closer to a center of the rotor than the outer flux barriers,
    wherein a magnet is inserted within a corresponding opening defined by at least one of the outer flux barriers, and a bridge is formed traversing a corresponding opening defined by at least one of the inner flux barriers at positions corresponding to the positions of the magnet such that a route of a magnetic flux is formed when a magnetic force is imposed on the magnets
    wherein the magnets are inserted within first and second sides of each of the outer flux barriers, and the bridges are provided at first and second sides of each of the inner flux barriers at positions corresponding to the positions of the magnets, and
    wherein center portions of the outer flux barriers are empty, and
    wherein all the space of the inner flux barriers, excluding the bridges. are empty.

* * * * *